United States Patent
Andruss et al.

(10) Patent No.: US 8,375,451 B1
(45) Date of Patent: *Feb. 12, 2013

(54) SECURITY FOR SCANNING OBJECTS

(75) Inventors: William Dale Andruss, Minneapolis, MN (US); Christopher Hercules Claudatos, San Jose, CA (US); Bruce David Leetch, Mason, OH (US); Steven R. Terwilliger, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,211

(22) Filed: Aug. 9, 2011

Related U.S. Application Data

(63) Continuation of application No. 11/477,216, filed on Jun. 28, 2006, now Pat. No. 8,087,084.

(51) Int. Cl.
*G06F 21/00* (2006.01)
(52) U.S. Cl. .......................................... 726/24; 713/188
(58) Field of Classification Search .............. 726/22–25; 713/188
See application file for complete search history.

(56) References Cited

U.S. PATENT DOCUMENTS

| | | | |
|---|---|---|---|
| 5,473,769 A | 12/1995 | Cozza | |
| 6,718,469 B2 | 4/2004 | Pak et al. | |
| 6,748,534 B1 | 6/2004 | Gryaznov et al. | |
| 6,763,466 B1 | 7/2004 | Glover | |
| 6,842,861 B1 | 1/2005 | Cox et al. | |
| 6,952,776 B1 | 10/2005 | Chess | |
| 7,043,634 B2 | 5/2006 | Wolf et al. | |
| 7,251,830 B1 | 7/2007 | Melchione | |
| 7,337,471 B2 | 2/2008 | Nachenberg et al. | |
| 7,469,419 B2 | 12/2008 | Sobel | |
| 7,475,427 B2 | 1/2009 | Palliyil et al. | |
| 7,496,960 B1 | 2/2009 | Chen et al. | |
| 7,533,272 B1 | 5/2009 | Gordon et al. | |
| 7,540,027 B2 | 5/2009 | Achanta et al. | |
| 7,854,006 B1 * | 12/2010 | Andruss et al. | 726/24 |
| 8,122,507 B1 * | 2/2012 | Andruss et al. | 726/24 |
| 2003/0046611 A1 | 3/2003 | Muttik et al. | |
| 2003/0074574 A1 | 4/2003 | Hursey et al. | |
| 2004/0153666 A1 | 8/2004 | Sobel | |
| 2004/0158730 A1 | 8/2004 | Sarkar | |
| 2005/0132205 A1 | 6/2005 | Palliyil et al. | |
| 2005/0177868 A1 | 8/2005 | Kwan | |
| 2006/0037079 A1 | 2/2006 | Midgley | |
| 2006/0072144 A1 | 4/2006 | Dowling et al. | |
| 2007/0101432 A1 | 5/2007 | Carpenter | |
| 2007/0220607 A1 | 9/2007 | Sprosts et al. | |
| 2010/0049860 A1 | 2/2010 | Kouvelas et al. | |

OTHER PUBLICATIONS

U.S. Appl. No. 11/395,755, filed Mar. 31, 2006, Andruss, William Dale.
U.S. Appl. No. 11/477,635, filed Jun. 28, 2006, Andruss, William Dale.
U.S. Appl. No. 11/477,634, filed Jun. 28, 2006, Andruss, William Dale.
U.S. Appl. No. 11/477,216, filed Jun. 28, 2006, Andruss, William Dale.

(Continued)

*Primary Examiner* — Hadi Armouche

(74) *Attorney, Agent, or Firm* — Theodore A. Chen; Krishnendu Gupta

(57) ABSTRACT

Scanning is disclosed. A system is monitored to detect object events, and it is determined whether an object event requires an update to a scan list. If an update is required, the scan list is authenticated. The scan list is updated with information regarding objects associated with the object event. Authentication may be performed by comparing a stored hash value of the scan list with a computed hash value of the scan list. If the scan list is not successfully authenticated, a full scan may be performed or a remotely stored scan list may be used.

14 Claims, 7 Drawing Sheets

OTHER PUBLICATIONS

U.S. Appl. No. 11/395,441, filed Mar. 31, 2006, Andruss, William Dale.
U.S. Appl. No. 12/909,089, filed Oct. 21, 2010, Andruss, William Dale.
MRSI: A Fast Pattern Matching Algorithm for Anti-virus Applications Xin Zhou; Bo Xi; Yaxuan Qi; Jun Li; Networking, 2008. ICN 2008. Seventh International Conference on Publication Year: 2008, pp. 256-261.
Virus Scan System Based on Hardware-Acceleration Baojun Zhang; Jiebing Wang; Xuezeng Pan; Computer and Computational Sciences, 2007. IMSCCS 2007. Second International Multi-Symposiums on Publication Year: 2007, pp. 344-351.
Hash-AV: fast virus signature scanning by cache-resident filters; Erdogan, O.; Pei Cao; Global Telecommunications Conference, 2005. GLOBECOM 2005. IEEE; pp. 1767-1762 vol. 3; Publication Year: 2005.
www.shareconnection.com/sauver-personal.htm which is an archive page from Aug. 31, 2004 of a description from CDMWORLD, printed out in 2009.
www.shareconnection.com/addriller.htm which is an archive page from Oct. 6, 2004 of a description from CDMWORLD, printed out in 2009.
Nachenberg, Computer Virus-Antivirus Coevolution, Communications of the ACM, vol. 40, No. 1, pp. 46-51, Jan. 1997.

* cited by examiner

SECURITY FOR SCANNING OBJECTS

CROSS REFERENCE TO OTHER APPLICATIONS

This application claims priority to co-pending U.S. patent application Ser. No. 11/395,755 for INCREMENTAL VIRUS SCAN, filed Mar. 31, 2006, which is incorporated herein by reference for all purposes. This application is a continuation of co-pending U.S. patent application Ser. No. 11/477,216 for SECURITY FOR SCANNING OBJECTS, filed on Jun. 28, 2006. This application is related to co-pending U.S. patent application Ser. No. 11/477,635 for EFFICIENT SCANNING OF OBJECTS, filed on Jun. 28, 2006, which is incorporated herein by reference for all purposes; and to co-pending U.S. patent application Ser. No. 11/477,634 for RISK-AWARE SCANNING OF OBJECTS, filed on Jun. 28, 2006, which is incorporated herein by reference for all purposes.

FIELD OF THE INVENTION

This invention relates generally to scanning objects, and more particularly to systems and methods for efficient scanning of a file or object repository for viruses or malware.

BACKGROUND OF THE INVENTION

This invention relates to a system and method for scanning computer files and/or objects for computer viruses or other malware. In the context of computers and machines, malware is a broad term that encompasses viruses and includes but is not limited to self-replicating/self-reproducing-automation programs that perform actions that are generally unwanted by the computer's user and may spread by inserting copies of themselves into the computer directly or into other executable code or documents on the same or other computers. The terms "virus" and "malware" may be used interchangeably herein.

Computer antivirus programs are commonly used to detect, clean, and remove computer viruses from infected objects such as data files. One form of detection typically used is file scanning of files resident on a hosting computer system's storage device(s). Files are scanned for the presence of an embedded virus, and the scanning may be either signature-based or heuristic (such as watching for suspicious behavior). However, virus scanning consumes significant processing cycles on the hosting computer, as well as increasing loads on the storage device being scanned.

Current antivirus products support on demand, on access, and on schedule scan operations. Scheduled scan operations scan a selected set of targets that may include all files residing on all storage devices (such as hard drives) attached to the computer platform being scanned. Filtering techniques for target selection are typically very limited, however. The user can manually enter a list of named files or select full hard drives for the scheduled scan. Manually entering a long list of named files is time consuming, and may require frequent manual updates by the user as the contents of the storage devices change. Further, a scheduled scan of all hard drive contents degrades the performance of the computer platform for a long period of time. All resources involved in a scan will be affected during the scan. For example, if the scan is being performed over a network, scanning all storage devices increases network utilization with consequent possible decrease in network performance.

Because antivirus scan operations degrade the host computer platform performance during the period of time that the scan operation is executing, it is desirable to shorten the scan operation period. If the scan operation period is shortened, the computer will be subject to less performance degradation—either lower load while scanning, or scanning for a shorter period of time. It is also desirable to shorten the scan operation period without weakening protection of the host computer platform.

There is a need, therefore, for an improved method, article of manufacture, and apparatus for efficiently detecting viruses on a computer system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which an antivirus scanning program executes, but it should be understood that the principles of the invention are not limited to this particular configuration. Rather, they may be applied to any system in which files or objects are scanned, either on a local or remote device, and the device may comprise one or more storage devices. Although the scanning methods herein are described in terms of their application to antivirus scanning, one skilled in the art will recognize that they are equally applicable to other cases for which it is desirable to scan files or objects periodically. Disclosed herein are a method and system to perform scan operations on storage devices in a manner that reduces performance degradation resulting from scanning, by reducing the number of files or objects needing to be scanned. This reduction is accomplished without increasing the risk of virus infection (i.e., a virus has penetrated a computer system and inserted itself into an object, such as a data file, hosted by the computer) or damage to the host computer system being scanned.

Figure 1:
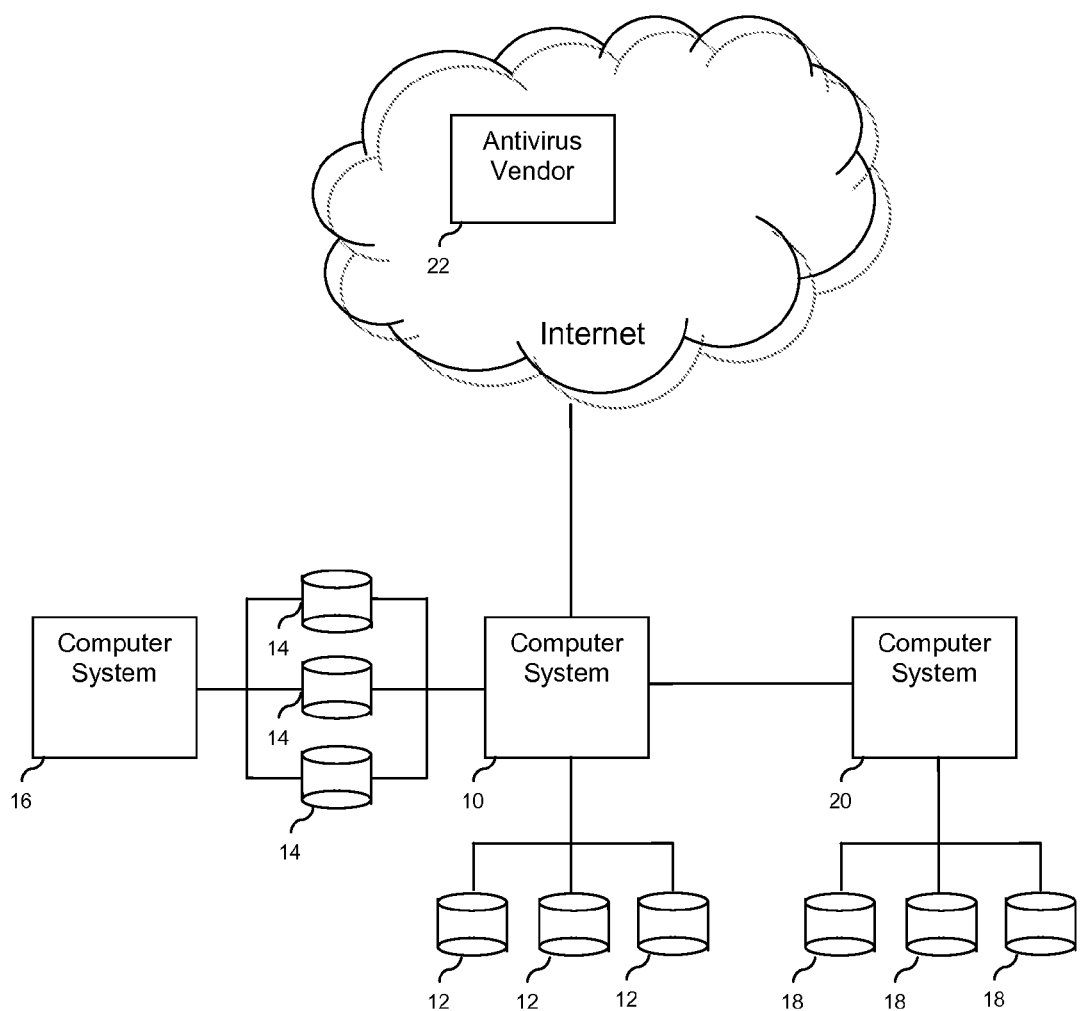
FIG. 1 is a diagram of an embodiment of a system in accordance with the invention.

FIG. 1 shows several possible configurations in which an antivirus program executing on a computer system 10 could be used to scan for viruses—on dedicated local storage devices 12, on storage devices 14 shared with another computer system 16, or on storage devices 18 associated with another computer system 20. Computer system 10 may communicate with computer system 20 or any other device via a network or other means of communication. Computer system 10 is in communication with the Internet, and may be configured to receive virus definitions/updates from an antivirus vendor 22, though it should be understood that virus definitions/updates may be received by other means such as by physical media.

In an embodiment, a scanning method employed by an antivirus program may use a file inclusion list to determine files to be scanned, in order to reduce the performance degradation period associated with antivirus scan operations while maintaining an acceptable level of protection from virus infection and damage. The method may comprise scanning only files that have changed during a defined time period. If the computer system protected by the antivirus software was free of any virus infections at the beginning of the time period, then only files that have changed during the time period are at risk for virus infection or damage. Files that have changed during the time period usually constitute a very small portion of the total files residing on computer hard drives. Modern desktop and workstation computer platforms typically have in excess of 100,000 resident files. Running an antivirus scan on all files may result in a scan operation that runs for several hours, causing performance degradation during the scan period. By scanning only changed files in accordance with the algorithm, the scan operation run time may be reduced to a few seconds or a few minutes.

The scanning methods described herein may be used with various methods of virus detection. For example, they may be used with a signature-based virus scan, in which a virus description supplied by an antivirus vendor or other source when searching a file for a previously discovered virus. A signature may comprise a unique string of bits, or the binary pattern, of all or part of a computer virus. The virus signature is akin to a fingerprint in that it can be used to detect and identify specific viruses. A heuristic virus scan may also be used, in algorithms that search for common virus behaviors may be used to detect previously unknown computer viruses. Heuristic virus scans may be platform-specific.

In an embodiment, a virus scanning method comprising "incremental scanning" may be used. The method may be used with a computer system that utilizes a change log, which provides the ability to identify significant file events on the host computer. Such events may include file actions like modification, deletion, encryption, rename, relocation, and compression. A log entry could include the date/time of the event, an indication of the affected file (such as the filename), and a description of the event action. In an embodiment, an agent on the host computer may be provided to monitor the change log and add or remove entries from file scan lists provided as input parameters to an antivirus scan operation. This may, for example, be implemented as a process or daemon that watches the change log for changes and updates file scan lists as needed. In one embodiment, a process may monitor file system operations directly for operations that alter files in ways that may result in infection of the files. This could, for example, be implemented as a trap that captures all file system operations and commands and examines them before passing them through. Events that could result in infection would cause the file (or rather, its information such as a file identifier, perhaps in the form of a file name) to be added to the file scan list. The file scan list may be implemented as a file residing on a storage device (local or remote), to be accessed by the antivirus program at scan time, or kept in memory. In an embodiment, the list could also be passed to other programs, such as the antivirus program, using an application programming interface (API).

Figure 2:
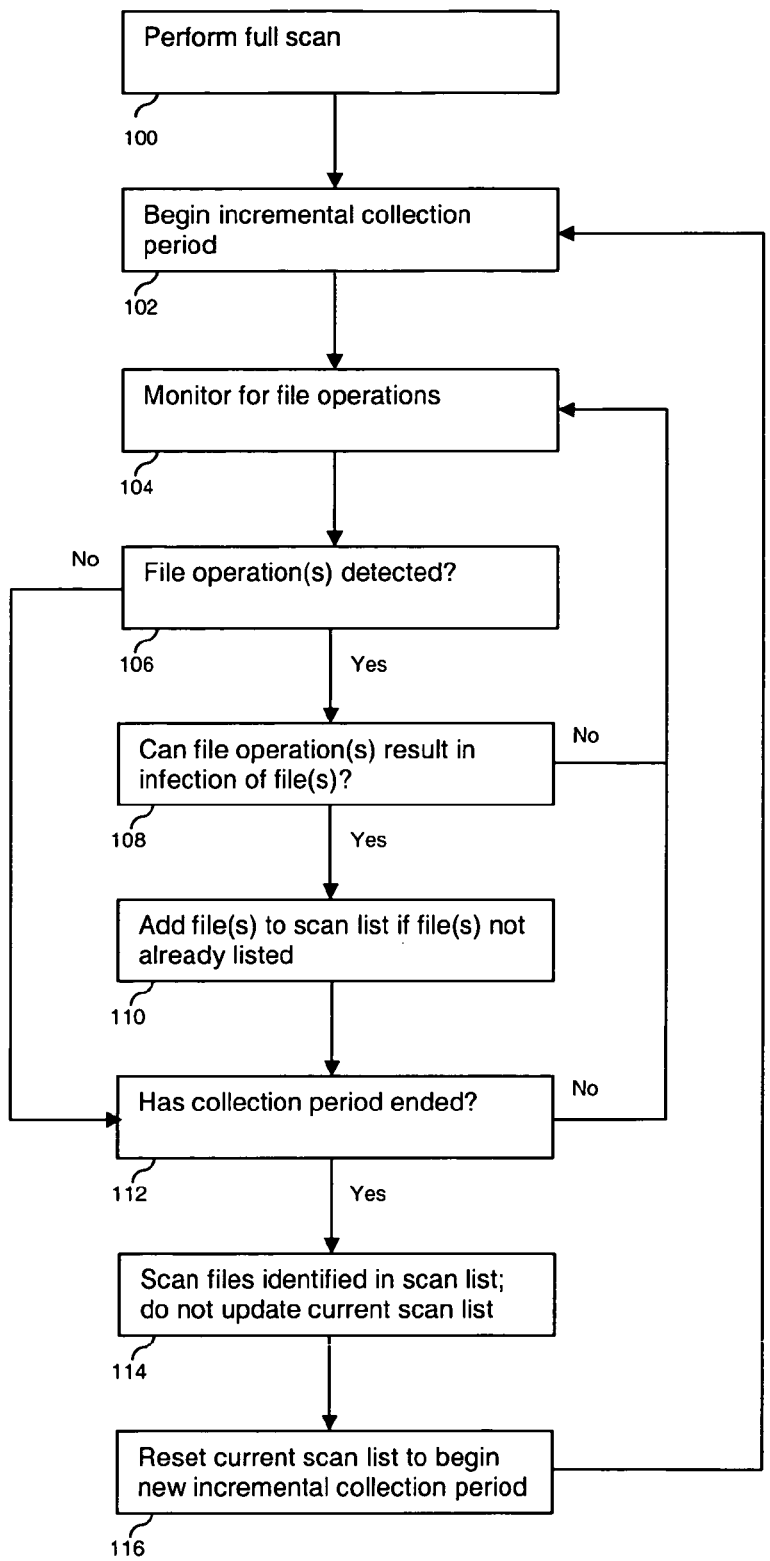
FIG. 2 is a flowchart illustrating a process for incremental scan.

FIG. 2 illustrates an embodiment of a process flow for an incremental scan. A full scan may be performed to ensure that the storage device (or a plurality of storage devices, or a portion of a storage device such as a directory or partition) is free from viruses, step 100. A full scan may be run before a file change logging service begins to capture file change events in a new or recently emptied file scan list. If a file scan list has grown extremely large for any reason, it may be desirable to clear the list and run a full scan. Scheduled virus scan operations are repeating actions initiated at a specific start time at the end of each scan interval. In an embodiment, a scheduled scan is performed, and the incremental scan interval begins after the scheduled scan. The incremental collection period runs, as shown in FIG. 2 at 102, and this may coincide with the incremental scan interval. During this time, no scan is performed. The change log is monitored for file operation events, or some other method of monitoring for file operations may be used, step 104. If a file operation is detected, step 106, it is determined whether the file operation is of a nature that could result in infection of the file, step 108. If the file operation could result in infection of the file, then in step 110, the file is added to the file scan list if it is not already listed. Thus, the file scan list is updated to indicate files that need to be scanned based on events that occur during the incremental collection period. In one embodiment, versions of files may be tracked, and thus the process would be made capable of distinguishing between versions. The file scan list could then contain multiple versions of a given file. A determination is made as to whether the incremental collection period has ended, step 112. If the incremental collection period has not ended, the process may return to monitoring for file operations, step 104. At the end of the incremental scan interval, the incremental collection period also ends, and a scheduled scan is performed using the file scan list to determine which files must be scanned, step 114. The file scan list is reset to begin a new incremental collection period, step 116, and the process returns to step 102 to start the incremental collection period. Alternatively, the files in the scan list could be marked as inactive for scanning purposes, or a new scan list could be created with a new list of files for the new collection period. It may be desired to save file scan lists, such as for administrative or analytical purposes.

In an embodiment, on demand scan operations may be initiated at any time using the file scan list; i.e., the user may initiate a scan as desired, for any reason. An on demand scan may reset the scan interval, as if a scheduled scan had occurred. An on demand scan may end an incremental scan interval if the on demand scan includes all files currently in the incremental scan list. In one embodiment, an on demand scan would not end a differential scan interval, except in the extreme case that the client platform has been completely restored from an uninfected backup image. On access scans may be performed using the file scan list to improve the efficiency of the scan operation. This may in one embodiment be used to provide the protection normally associated with on access scans but reduce the performance penalty from on access scans. Typically, on access scans cause a file to be scanned every time it is accessed, resulting in significant performance degradation. Use of a file scan list could allow the virus scan to skip files that have not been modified since their last scan (and thus present little or no risk), and instead scan only files that have been modified.

As described herein, an incremental virus scan processes the files changed during the incremental collection period. In an embodiment, an incremental scan will never scan the same version of a file more than once. The incremental collection period may be equal to the incremental scan interval such that exactly one incremental scan operation is run during a single incremental collection period. These files are identified by the contents of the incremental scan list accumulated during this interval. The current incremental scan list is frozen at the time the incremental virus scan is initiated. At the same time, the agent begins creating a new list for the next incremental scan interval. Thus, collection for the new scan list begins concurrently with the initiation of an incremental scan, and continues while the scan is performed. The goal of incremental scan operations is to discover virus infections as soon as possible after a file is modified.

The selection of a collection period and scan interval for incremental scans may in one embodiment be selected to correspond to expectations of world-wide virus origination frequency. Thus, if a new virus release occurs approximately every two hours, the incremental scan interval may be set to a value less than two hours. The interval would be short enough to provide a margin of safety.

Figure 3:
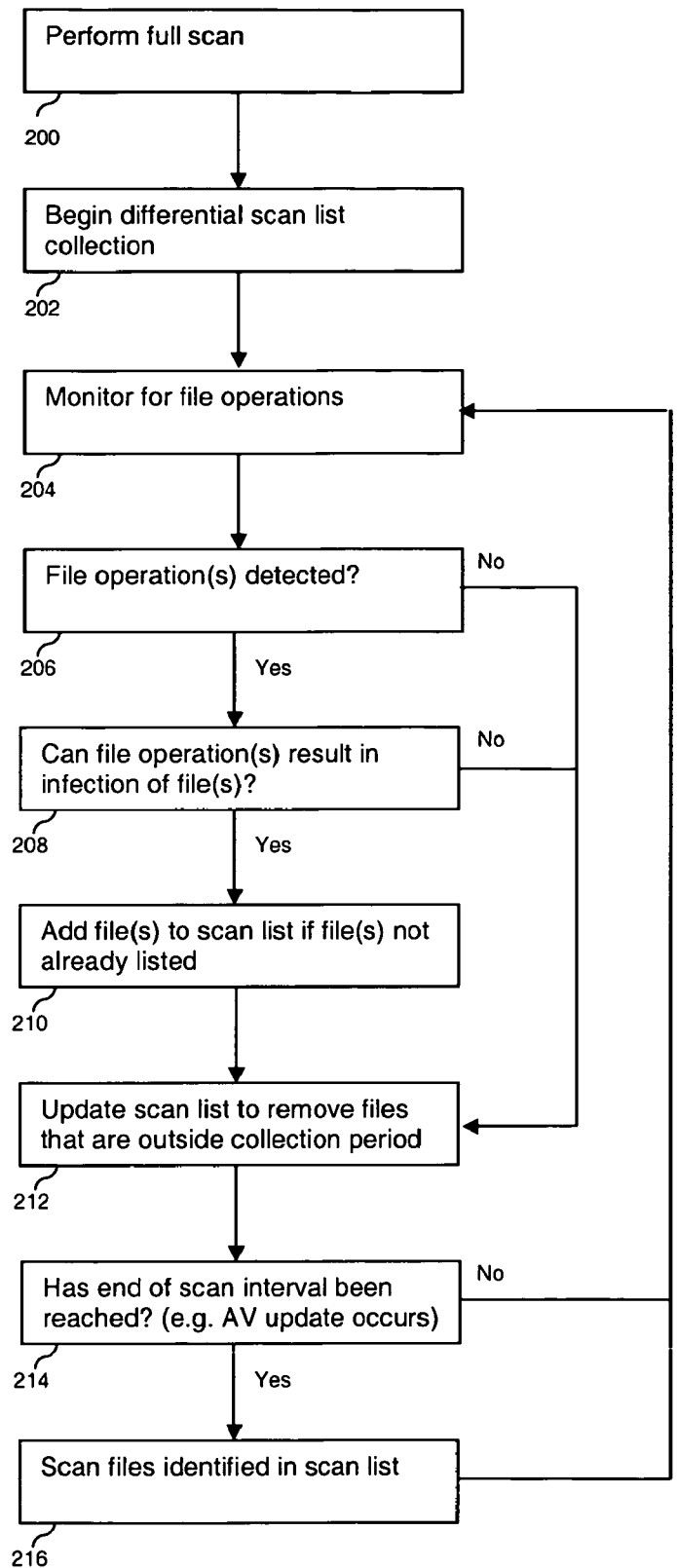
FIG. 3 is a flowchart illustrating a process for differential scan.

In one embodiment, a virus scanning method may comprise a "differential scan". A process for differential scanning is illustrated in FIG. 3. A full scan may be performed in step 200 to ensure that the storage device is free of infections. After the full scan (or optionally no scan may be done), the differential collection period may begin, and the differential scan list collection begins, step 202. A differential scan may process the files changed during the differential collection period. The change log is monitored (or other method of detecting file operations) for file operations, step 204, and if file operations are detected, step 206, it is determined whether the file operations may result in infections, step 208. If so, the files are added to the scan list if not already listed, step 210. A file may be subject to multiple file operation events during the differential collection period. A file already included in the scan list may be relocated to the top of the list during step 210 as a result of a subsequent operation. For example, a file last modified 20 days ago, would be relocated to the top of the list if subsequently reported as modified during the current inspection of the event log. Versions may be tracked in an embodiment, and multiple versions of a file may appear on the scan list. If no file operations are detected or the file operations are not considered capable of resulting in infections, the process goes to step 212. At 212, the scan list is updated to remove any files that have fallen outside the collection period. For example, if the collection period were set to 35 days, files that were last operated on (in a way that could result in infection) more than 35 days ago are removed from the scan list. Alternatively, the files in the scan list could be marked as inactive for scanning purposes, or a new scan list could be created with the updated list of files. It may be desired to save file scan lists, such as for administrative or analytical purposes. The process checks whether the end of the differential scan interval has been reached, step 214. This may be set according to a timer or occurrence of an antivirus update, for example. If the end of the differential scan interval has not yet been reached, the process returns to step 204 to monitor for file operations. If the end of the differential scan interval has been reached, the files identified in the scan list are scanned, step 216, and the process returns to step 204.

It may be desired, in an embodiment, to identify previous file operations prior to the initiation of the differential collection period. For example, if a 35-day window was set, then at the beginning of the differential collection period, it may be desired to examine file operations up to 35 days prior. In this case, the process would collect the previous file operations, proceed to determining whether the file operations may result in infection of the files in step 208, and continue as described herein.

The files are identified by the contents of the differential scan list accumulated during this period. Once a file is added to the differential scan list, the file may be scanned multiple times before the age of the file causes the file to be removed from the scan list. Additional scans are only beneficial after new virus signatures and/or new heuristic scan algorithms have been released by the antivirus product vendor. The collection period is a continuously moving time interval and the agent maintaining the differential scan list is continuously adding and removing files from the list. In an embodiment, the scan interval is always shorter than the collection period, to ensure that files that are added to the scan list will be scanned at least once before they are removed from the scan list. For example, if the collection period is ten days and the scan interval is two days, then five differential scans (10 days divided by 2 days) would be run during each collection period. Collected files modified before the start of the collection period are removed, and files that are changed during the collection period are added to the scan list. Differential scans may be used to discover files infected by previously unknown viruses during the collection period, as described herein.

In an embodiment, selection of a collection period for differential scan lists may correspond to an expected time for the antivirus product vendor (or similar antivirus resource) to discover, analyze, and release virus signatures for previously unknown computer viruses. For example, if the expected time from release of the virus to the release of virus signatures is 30 days, the collection period might be set to 35 days, adding a 5-day margin of safety. The selection of a scan interval for differential scans may correspond to automatic ("live") update operations of the virus signatures and scan engines used by antivirus products to scan for all previously discovered viruses. The scheduled differential scan operation would run immediately following successful completion of an automatic update operation. If an antivirus software vendor releases such updates once every 48 hours, the user may elect to schedule automatic updates corresponding to the vendor release schedule. In an embodiment, a differential scan would not be run unless either new virus definitions or a new version of the scan engine have been released since the previous differential scan. Otherwise, there is no value in scanning a file already scanned using the existing virus definitions and scan engine, because there is zero probability of detecting an infection.

Figure 4:
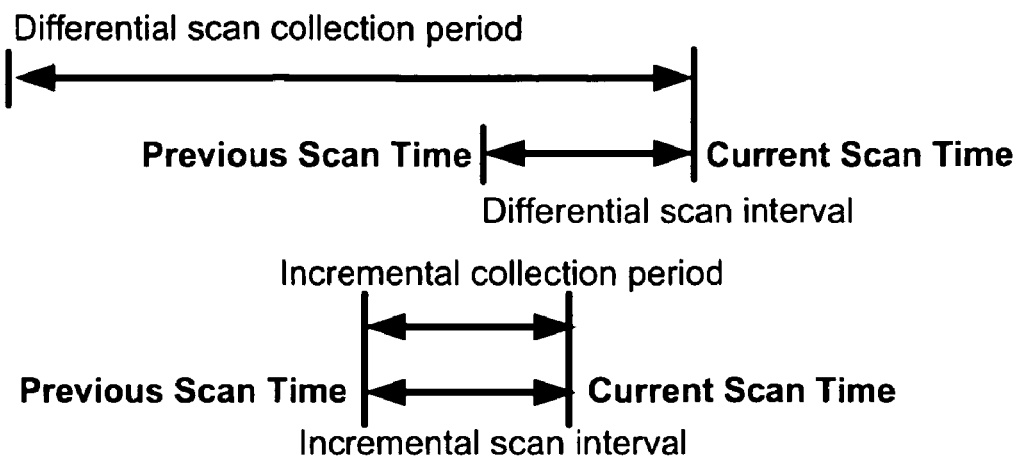
FIG. 4 is a diagram illustrating embodiments of incremental and differential scans.
Figure 5:
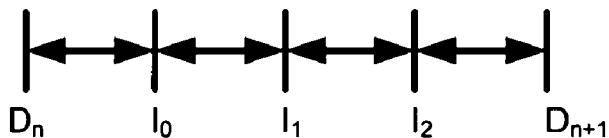
FIG. 5 is a diagram illustrating incremental and differential scans used together.

FIG. 4 illustrates a comparison of differential and incremental scans. The relationship between the differential collection period and the differential scan interval is shown, as well as the relationship between the incremental collection period and the incremental scan interval. FIG. 5 illustrates how, in one embodiment, incremental and differential scans might be used together. As shown, incremental scan intervals could be completely nested within differential scan intervals. Incremental scans may be performed during a differential scan interval. In an embodiment, the differential collection period is likely to be longer than the interval collection period, because the differential collection period is based on the frequency of updates to the scan engine or virus definitions, while the interval collection period is based on the frequency of virus releases, which is usually much higher. Performing a differential scan would also end the incremental scan interval and incremental collection period, resetting the incremental scan list, because all files that changed and are included in the incremental scan list would also be listed on the differential scan list (since they will be within the differential collection period). However, performing an incremental scan would not alter the differential scan interval or the differential scan list. Combining the incremental and differential scans has the advantage of detecting virus infections quickly, and promptly searching for previously undiscovered infections when new updates are released.

Figure 6:
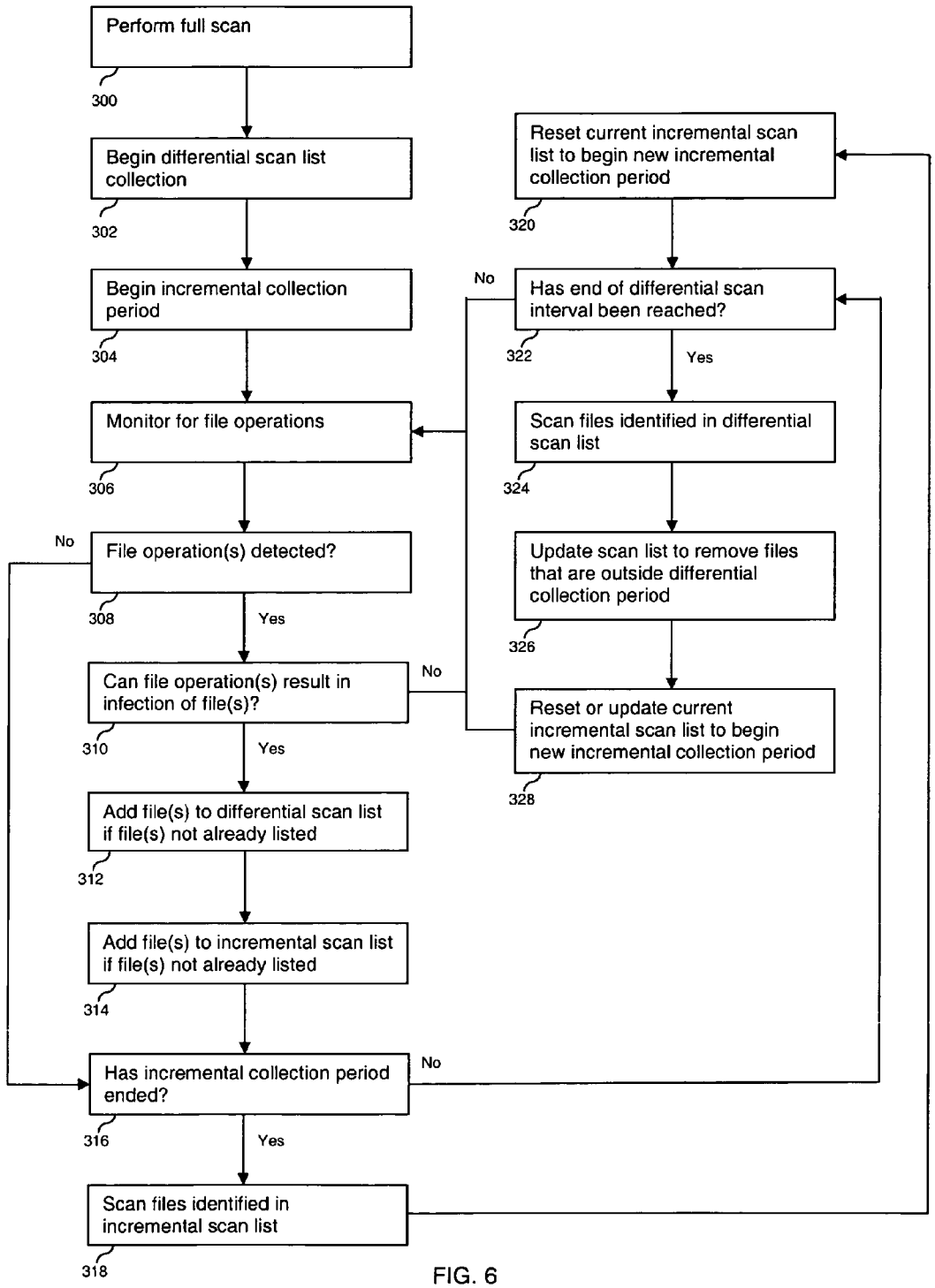
FIG. 6 is a flowchart illustrating a process for using incremental scan in conjunction with differential scan.

An embodiment of a process flow using incremental and differential scans is shown in FIG. 6. A full scan may be performed first, step 300. After the full scan (or optionally no scan may be done), the differential collection period may begin, and the differential scan list collection begins, step 302. The incremental collection period begins, step 304. Scan lists are established for the differential scan and for the incremental scan. These may be separate lists stored in separate files, separate lists stored in the same file, or a single list with flags to mark entries for differential and/or incremental scanning. The change log is monitored (or other method of detecting file operations) for file operations, step 306. If a file operation is detected, step 308, it is determined whether the file operation is of a nature that could result in infection of the file, step 310. If the file operation could result in infection of the file, then in step 312, the file is added to the differential scan list if it is not already listed. In step 314, the file is added to the incremental scan list if it is not already listed. Thus, the file scan lists are updated to indicate files that need to be scanned based on events that occur during the differential and incremental collection periods.

A determination is made as to whether the incremental collection period has ended, step 316. If the incremental collection period has not ended, the process may then check whether the end of the differential scan interval has been reached, step 322. If the incremental collection period has ended, step 316, the files identified in the incremental scan list are scanned, step 318. The file scan list may be reset to begin a new incremental collection period, step 320, and the process checks whether the differential scan interval has ended, step 322. If the differential scan interval has not ended, the process proceeds to step 306 to monitor for file operations. If the differential scan interval has ended, step 322, the files identified in the differential scan list are scanned, step 324. In step 326, the differential scan list is updated to remove files that are outside the differential collection period. The update could be performed before performing the scan, in which case files that have aged out of the differential collection period since the last update would not be scanned again, instead of being scanned one more time. In step 328, the current incremental scan list may be reset (or otherwise updated) to begin a new incremental collection period. Files from the differential scan list that appear on the incremental scan list may be removed from the incremental scan list. In one embodiment, all files in the incremental scan list will also be on the differential scan list, so after a differential scan has been performed, all files from the incremental scan list will have been scanned and do not need to be scanned again unless a file operation occurs to make the file a candidate for scan again. The process may then monitor for file operations, step 306.

Risk levels may be assigned to various files or groups of files based on file type and/or file location. Risk levels may also be determined from object content. For example, an antivirus vendor may have a priori knowledge of which file types are most likely to be points of introduction for a virus. The vendor may also have knowledge of which folder/directory locations are most likely to be points of introduction. In an embodiment, risk information may be distributed and updated regularly as part of scan engine updates, and used to control scanning based on thresholds defined by a user or system administrator through administrative settings. Several risk thresholds may be used, with different levels of scanning. High risk files may be scanned immediately on any file access, while lower risk files could be added to the incremental and/or differential scan list based on any file access or only file modification events. Low risk files might be added to the incremental scan list only for file modification events.

Figure 7:
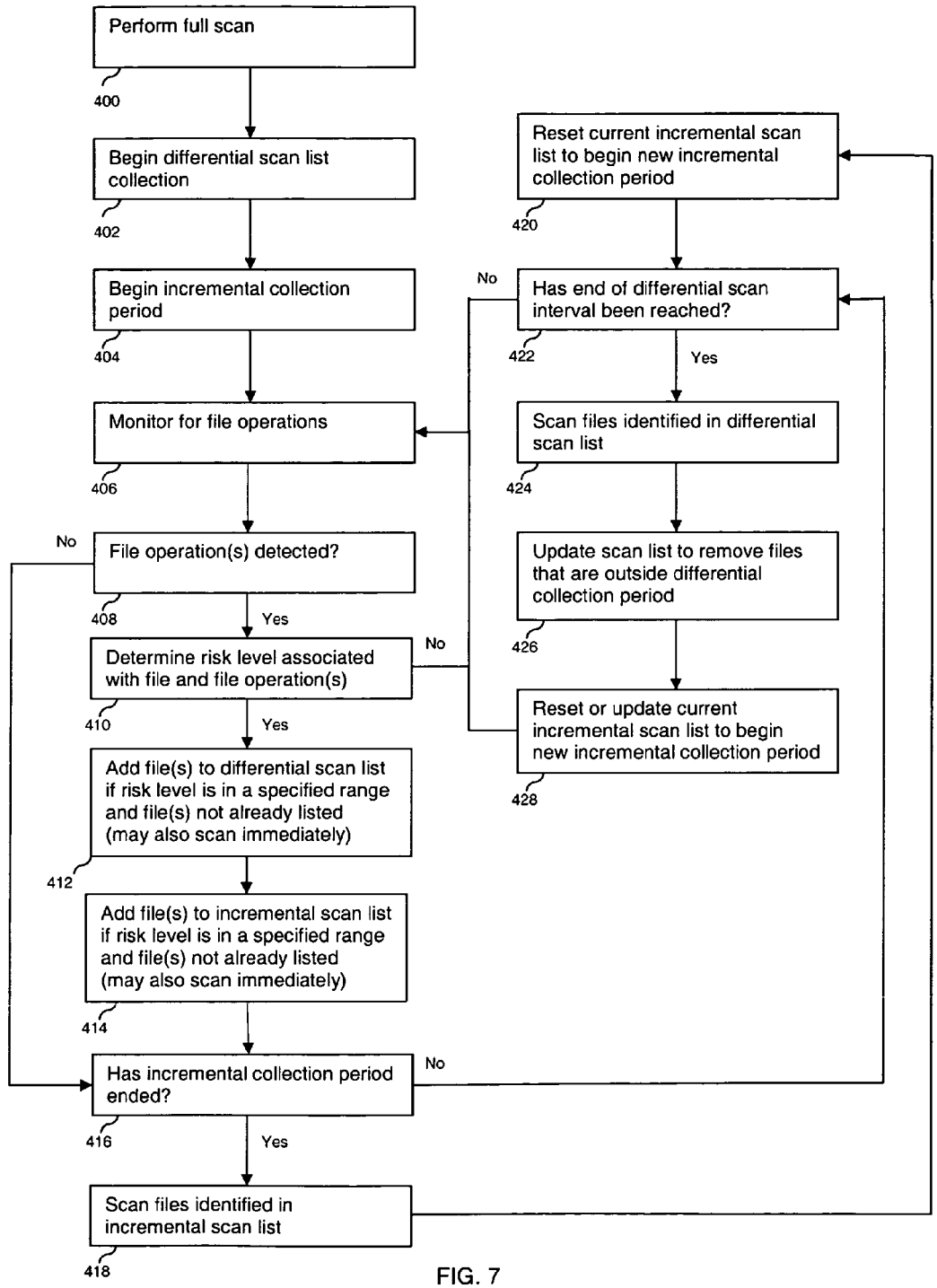
FIG. 7 is a flowchart illustrating a process for using risk level to schedule a scan.

FIG. 7 illustrates a process flow for utilizing risk in determining scan levels. A full scan may be performed first in step 400. The differential collection period may begin, and the differential scan list collection begins, step 402, and the incremental collection period begins, step 404. Scan lists are established for the differential scan and for the incremental scan and may be separate files or a shared file. The process monitors for file operations, step 406, and if a file operation is detected, step 408, it is determined what level of risk is associated with the file and file operation(s), step 410. In step 412, if the risk is in a specified range, the file may be added to the differential scan list if not already present on the list, and a scan may be performed immediately upon access. In step 414, if the risk is in a specified range, the file may be added to the incremental scan list if not already present on the list, and a scan may be performed immediately upon access. Thus, the file scan lists are updated to indicate files that need to be scanned based on events that occur during the differential and incremental collection periods, and based upon risk levels associated with the files and events. The ranges resulting in immediate on access scan, addition to the differential scan list, and/or addition to the incremental scan list, may be set by a user or administrator or according to a policy.

In step 416, the process checks whether the incremental collection period has ended, and if not, checks whether the end of the differential scan interval has been reached in step 422. If the incremental collection period has ended, step 416, the process performs the incremental scan using the incremental scan list, step 418. The file scan list may be reset to begin a new incremental collection period, step 420. In step 422, the process checks whether the differential scan interval has ended, step 422, and if not, proceeds to step 406 to monitor for file operations. If the differential scan interval has ended, the files identified in the differential scan list are scanned in step 424, and the differential scan list is updated to remove files that are outside the differential collection period, step 426. This update may also be performed before step 424. In step 428, the current incremental scan list may be reset or updated to begin a new incremental collection period. The process may then monitor for file operations, step 406.

In one embodiment, risk levels could be given in a range of zero to one with zero indicating lowest risk and one indicating highest. An example of combined usage might be as follows:

R>=0.8: scan the file immediately for any file access event.
0.5<=R<0.8: add the file to the differential scan list and incremental scan list for a file modification event.
R<=0.5: add the file to the incremental scan list for a file modification event.

These ranges may be set by a user or administrator, or by policy. Other configurations and combinations of risk levels and actions are possible, and the disclosure herein is intended to be illustrative and not restrictive. In an embodiment, the inverse of risk may be used, such as safety. In this case, a higher safety level would require a lower level of protection (such as incremental scan only), and a lower safety level would require a higher level of protection (such as immediate scan on access).

The change log and/or file scan list may be protected from unauthorized alteration, tampering, copying, viewing, and deletion. In addition, if historical versions of the change log and/or file scan list are maintained these may also be protected from unauthorized alteration, tampering, copying, viewing, and deletion. The change log and/or file scan list may be encrypted, hashed, or protected by various means of authentication. In an embodiment, a hash algorithm such as MD5 or SHA may be used to generate a hash value for the change log/file scan list. The hash value may be stored in any location; e.g., in the change log/file scan list, in a separate location locally, or in a remote location at another site. When the change log/file scan list is accessed, the hash algorithm may be used to generate the hash value for the change log/file scan list and compare it to the stored hash value to authenticate the change log/file scan list. A mismatch would indicate that the file has been altered by an unauthorized process, and the change log/file scan list would be considered untrustworthy. In this event, a full scan may be performed.

In an embodiment, the change log/file scan list may be stored remotely or stored locally with a copy stored remotely. A secure, remote copy may provide an additional level of protection from malicious software elements that attempt to corrupt the local copy of the change log/file scan list. The remote copy could be accessed in the event that the local copy has been found to be untrustworthy. The remote copy could also be secured as described herein, and verified before use. If the remote copy is found to be untrustworthy as well, other remote copies may be checked, or a full scan could be performed. Use of this approach may be used to obviate the need for full scans, which often cause significant performance degradation.

Figure 8:
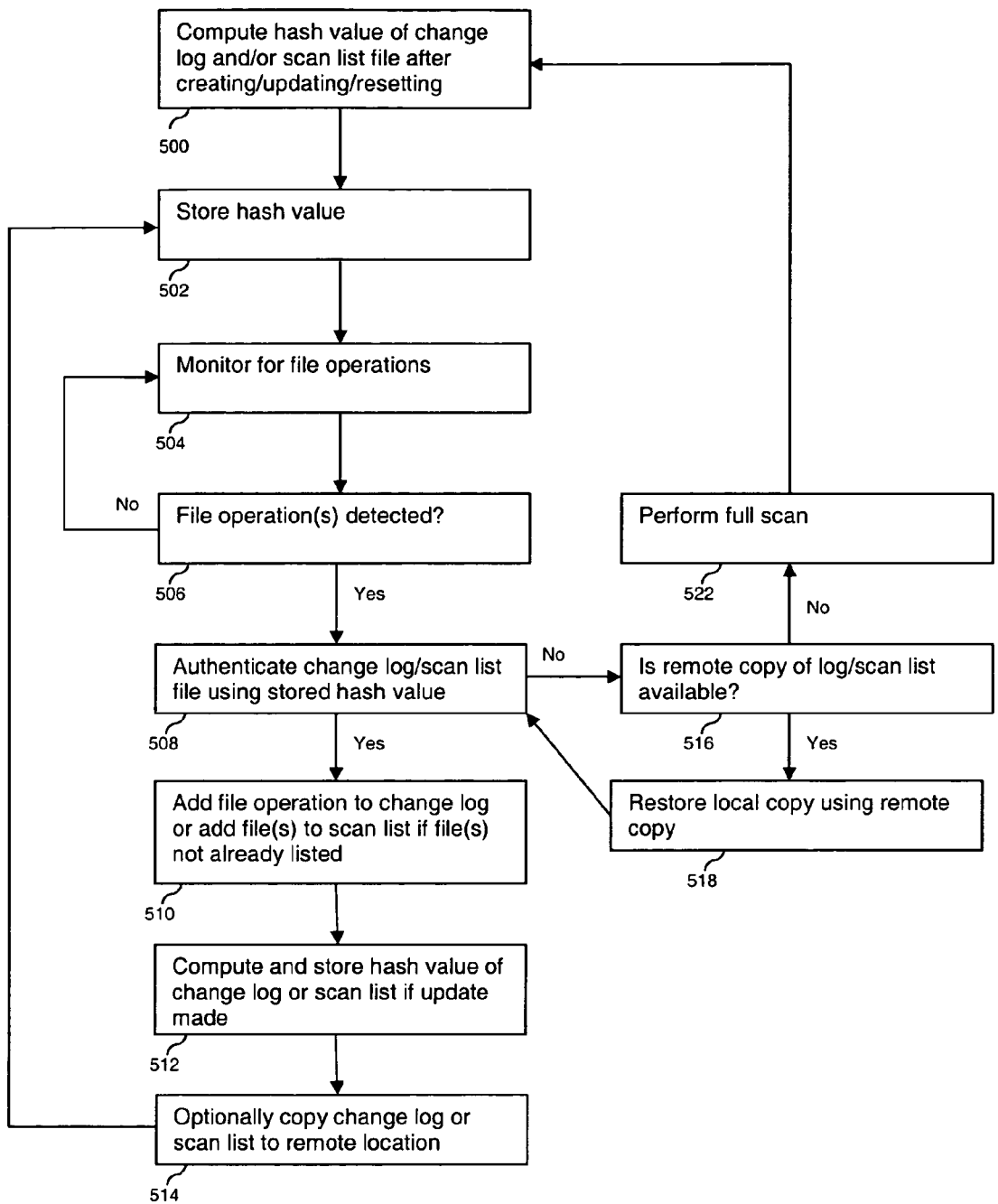
FIG. 8 is a flowchart illustrating a process for providing security for scanning objects.

FIG. 8 illustrates a process for securing the change log and/or file scan list. In step 500, a hash value may be computed for a change log or file scan list after creating or updating or resetting the log or scan list. This hash value is stored, step 502, and it may be stored with the log/scan list or in a separate location such as another file locally or remotely (such as on another system or at a different site), or in memory. The process monitors for file operations, step 504, and if a file operation is detected, step 506, the log/scan list is authenticated using the stored hash value, step 508. Authentication may be performed by computing the hash value of the log/scan list and comparing it with the stored hash value. Upon successful authentication, the file operation may be added to the change log or the file may be added to the scan list if not already listed, step 510. In an embodiment, the authentication may be performed in the case of a scan list only if the file operation requires an update to the scan list, and only if the file does not already appear in the scan list. In this case, the process would check whether an update needs to be made to the scan list before attempting to authenticate the file, enabling it to avoid unnecessary computation if no updates need to be made to the scan list. After the update has been made (if there is an update), the hash value of the updated change log/file scan list is computed and stored, step 512. The change log or scan list may optionally be copied to a remote location, step 514.

If the change log/scan list is not successfully authenticated in step 508, the process may check whether a remote copy is available, step 516. If so, the remote copy may be used to restore a local copy, step 518, and authentication is again performed, step 508. If a remote copy is not available, step 516, a full scan may be performed, step 522. Upon performing a full scan, the scan list may optionally be updated to reflect the full scan. For example, if the scan list is an incremental scan list, and a full scan has just been performed, the scan list may be updated to remove all pending files or a new scan list may be established. The hash value of the log/scan list can then be computed, step 500.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for scanning objects in a system, comprising:
monitoring the system to detect an object event;
determining, based on the nature of the object event, whether the object event requires an update to a scan list, wherein the object event requiring the update to the scan list causes a condition for which the scanning is being performed;
authenticating the scan list if an update is required, wherein the authentication occurs after determining the update is required;

updating the scan list with information regarding an object associated with the object event, wherein updating the scan list comprises adding the object to the scan list if the object is not in the scan list accessing a stored hash value associated with the scan list;

computing a hash value of the scan list;

comparing the stored hash value with the computed hash value;

accessing a remotely stored scan list if the stored hash value does not match the computed hash value; and authenticating the remotely stored scan list.

2. The method as recited in claim 1, further comprising computing a hash value of the updated scan list.

3. The method as recited in claim 2, further comprising storing the hash value of the updated scan list at a remote location.

4. The method as recited in claim 3, further comprising storing the scan list at a remote location.

5. The method as recited in claim 4, further comprising computing a hash value of the remotely stored scan list.

6. The method as recited in claim 1, further comprising replacing the scan list with the remotely stored scan list.

7. The method as recited in claim 6, further comprising storing the scan list at a remote location after updating the scan list.

8. The method as recited in claim 7, further comprising computing a hash value for the remotely stored scan list.

9. The method as recited in claim 1, further comprising performing a full scan if the remotely stored scan list is not successfully authenticated.

10. The method as recited in claim 9, further comprising resetting the scan list.

11. The method as recited in claim 1, wherein the hash value is computed using a secure hash algorithm.

12. A method for scanning objects in a system, comprising:

monitoring a change log to detect an object event;

authenticating the change log;

scanning an object based on the object event detected in the change log and based on the nature of the object event;

determining, based on the nature of the object event, whether the object event requires an update to a scan list;

authenticating the scan list if an update is required, wherein the authentication occurs after determining the update is required;

updating the scan list with information regarding the object associated with the object event, wherein updating the scan list comprises adding the object to the scan list if the object is not in the scan list:

accessing a stored hash value associated with the change log;

computing a hash value of the change log;

comparing the stored hash value with the computed hash value;

accessing a remotely stored change log if the stored hash value does not match the computed hash value; and authenticating the remotely stored change log.

13. The method as recited in claim 12, further comprising performing a full scan if the change log is not successfully authenticated.

14. A computer program product for scanning objects in a system, comprising a non-transitory computer readable storage medium having machine readable code embodied therein for:

monitoring the system to detect an object event;

determining, based on the nature of the object event, whether the object event requires an update to a scan list, wherein the object event requiring the update to the scan list causes a condition for which the scanning is being performed;

authenticating the scan list if an update is required, wherein the authentication occurs after determining the update is required;

updating the scan list with information regarding an object associated with the object event, wherein updating the scan list comprises adding the object to the scan list if the object is not in the scan list:

accessing a stored hash value associated with the scan list;

computing a hash value of the scan list;

comparing the stored hash value with the computed hash value;

accessing a remotely stored scan list if the stored hash value does not match the computed hash value; and authenticating the remotely stored scan list.

* * * * *